(12) United States Patent
Whitton et al.

(10) Patent No.: US 11,819,920 B1
(45) Date of Patent: Nov. 21, 2023

(54) SYSTEMS AND METHODS FOR REPAIRING COMPRESSOR BLADES USING HYBRID MANUFACTURING TECHNIQUES

(71) Applicant: Chromalloy Gas Turbine LLC, Palm Beach Gardens, FL (US)

(72) Inventors: James Whitton, East Burke, VT (US); Zachary Oras, Riverview, FL (US); Zachary Hopkins, San Diego, CA (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 0 days.

(21) Appl. No.: 17/931,500

(22) Filed: Sep. 12, 2022

(51) Int. Cl.
*B22F 7/06* (2006.01)
*B22F 10/66* (2021.01)
*B22F 5/04* (2006.01)
*B33Y 40/20* (2020.01)
*B22F 10/40* (2021.01)

(52) U.S. Cl.
CPC .............. *B22F 7/062* (2013.01); *B22F 5/04* (2013.01); *B22F 10/40* (2021.01); *B22F 10/66* (2021.01); *B33Y 40/20* (2020.01); *B22F 2007/068* (2013.01)

(58) Field of Classification Search
CPC ...... B22F 2007/068; B22F 7/062; B22F 5/04; B22F 10/40; B22F 10/66; B33Y 40/20
See application file for complete search history.

(56) References Cited

U.S. PATENT DOCUMENTS

| | | | |
|---|---|---|---|
| 2012/0222306 A1* | 9/2012 | Mittendorf ............. | B33Y 30/00 29/889.1 |
| 2017/0129180 A1* | 5/2017 | Coates ............... | B23Q 11/0046 |

* cited by examiner

*Primary Examiner* — Moshe Wilensky
(74) *Attorney, Agent, or Firm* — AVEK IP, LLC

(57) ABSTRACT

Systems and methods for repairing compressor blades using hybrid manufacturing techniques. A tool for repairing a compressor blade has a plurality of support bases, and a slot configured for securement of said compressor blade to said mounting tool. The tool has a pair of support bases, each of which is configured for the building of a sacrificial support thereon to stabilize the compressor blade during repair. The tool is coupled to a hybrid manufacturing machinery and the sacrificial supports stabilize the compressor blade during additive and subtractive manufacturing processes.

16 Claims, 5 Drawing Sheets

SYSTEMS AND METHODS FOR REPAIRING COMPRESSOR BLADES USING HYBRID MANUFACTURING TECHNIQUES

FIELD OF INVENTION

The disclosure relates generally to the repair of blades. More specifically, the disclosure relates to a tool configured for retaining a compressor blade while it is repaired using additive and subtractive manufacturing processes.

BRIEF SUMMARY OF INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In some aspects, the techniques described herein relate to a method of repairing a compressor blade, including: providing a mounting tool, the mounting tool having a plurality of support bases and a slot, the slot configured for securement of the compressor blade to the mounting tool; securing the compressor blade to the mounting tool via the slot; associating the mounting tool and the secured compressor blade with a hybrid manufacturing machinery; using additive manufacturing to add material to: (a) the compressor blade secured to the mounting tool; and (b) the plurality of support bases to form a sacrificial support on each of the plurality of support bases; and using subtractive manufacturing to remove material from the compressor blade while the compressor blade is secured to the mounting tool; wherein, the plurality of sacrificial supports stabilize the compressor blade during the subtractive manufacturing and the additive manufacturing.

In some aspects, the techniques described herein relate to a method, wherein the subtractive manufacturing is initiated before the additive manufacturing is completed.

In some aspects, the techniques described herein relate to a method, further including using the additive manufacturing to build a bridge spanning from the compressor blade to each of the plurality of sacrificial supports.

In some aspects, the techniques described herein relate to a method, wherein the plurality of support bases are formed as part of the mounting tool.

In some aspects, the techniques described herein relate to a method, wherein each of the plurality of support bases is releasably attached to the mounting tool.

In some aspects, the techniques described herein relate to a method, further including dissociating the sacrificial supports from the compressor blade after the compressor blade is repaired.

In some aspects, the techniques described herein relate to a method, wherein the mounting tool includes a fastener for securing the compressor blade within the slot.

In some aspects, the techniques described herein relate to a method, further including tightening the fastener via an opening in the mounting tool.

In some aspects, the techniques described herein relate to a method, further including disassociating the compressor blade from the mounting tool.

In some aspects, the techniques described herein relate to a method, further including carrying out a finishing process after the compressor blade is disassociated from the mounting tool.

In some aspects, the techniques described herein relate to a mounting tool for repairing a compressor blade, including: a slot for securing the compressor blade to the mounting tool; a pair of support bases, each of the pair of support bases adjacent one edge of the compressor blade when the compressor blade is secured to the mounting tool; a mechanism for securing the mounting tool to a hybrid manufacturing machine; wherein, each of the pair of support bases is configured for the building of a sacrificial support thereon.

In some aspects, the techniques described herein relate to a mounting tool, further including a fastener within the slot.

In some aspects, the techniques described herein relate to a mounting tool, further including an aperture configured for allowing the fastener to be accessed.

In some aspects, the techniques described herein relate to a mounting tool, wherein each of the pair of support bases is removably affixed to the mounting tool.

In some aspects, the techniques described herein relate to a mounting tool, wherein each of the pair of support bases is permanently attached to the mounting tool.

In some aspects, the techniques described herein relate to a method of repairing a compressor blade, including: providing a mounting tool, the mounting tool having a plurality of support bases and a slot, the slot configured for securement of the compressor blade to the mounting tool; securing the compressor blade to the mounting tool via the slot; associating the mounting tool and the secured compressor blade with a hybrid manufacturing machinery; and using each of additive manufacturing and subtractive manufacturing to repair the compressor blade while the compressor blade is secured to the mounting tool.

In some aspects, the techniques described herein relate to a method, further including building a sacrificial support on each of the plurality of support bases while the compressor blade is secured to the mounting tool.

In some aspects, the techniques described herein relate to a method, further including building a plurality of bridges, each of the plurality of bridges connecting the compressor blade to one of the sacrificial supports.

In some aspects, the techniques described herein relate to a method, further including removing the compressor blade from the mounting tool for finishing.

In some aspects, the techniques described herein relate to a method, wherein at least a first part of the additive manufacturing is effectuated prior to at least a first part of the substrative manufacturing and at least a second part of the additive manufacturing is effectuated after the first part of the substrative manufacturing.

DETAILED DESCRIPTION OF THE INVENTION

Figure 1:
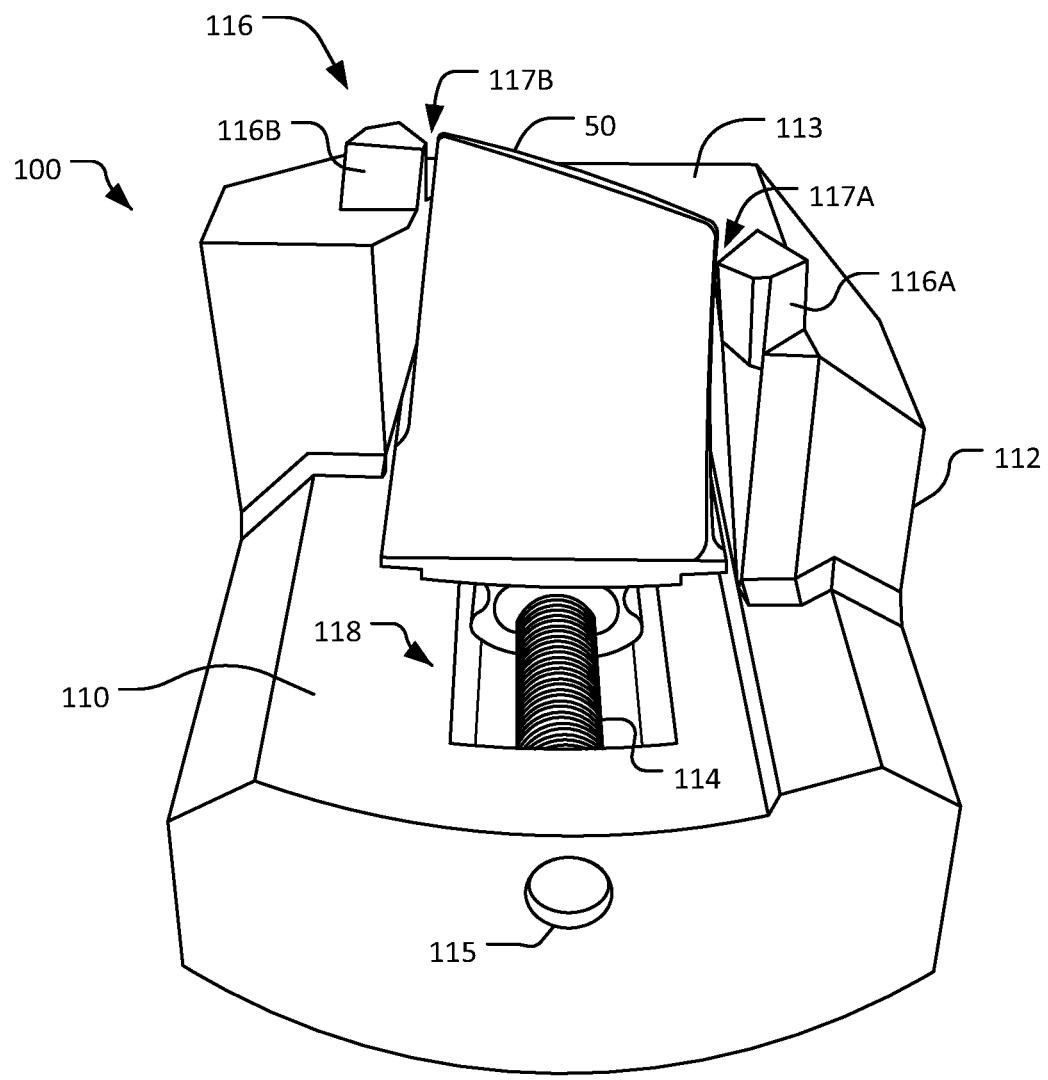
FIG. 1 is a perspective view of a mounting tool for use in repairing a compressor blade according to an embodiment of the present disclosure.
Figure 1:
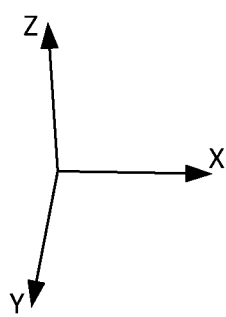
Figure 2:
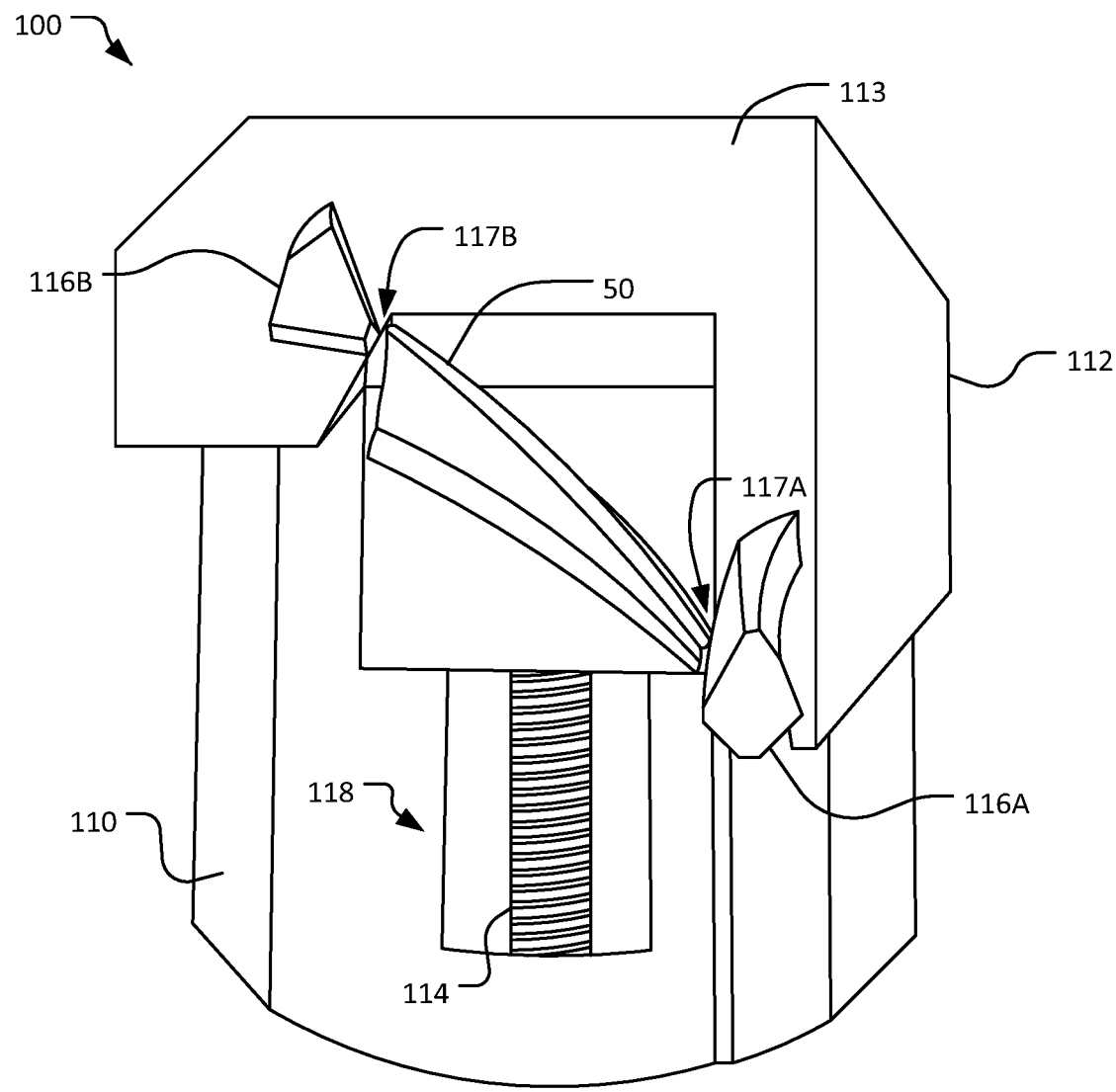
FIG. 2 is a top view of the mounting tool and an unrepaired compressor blade of FIG. 1.
Figure 2:
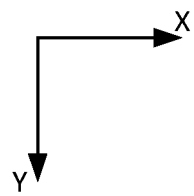
Figure 3:
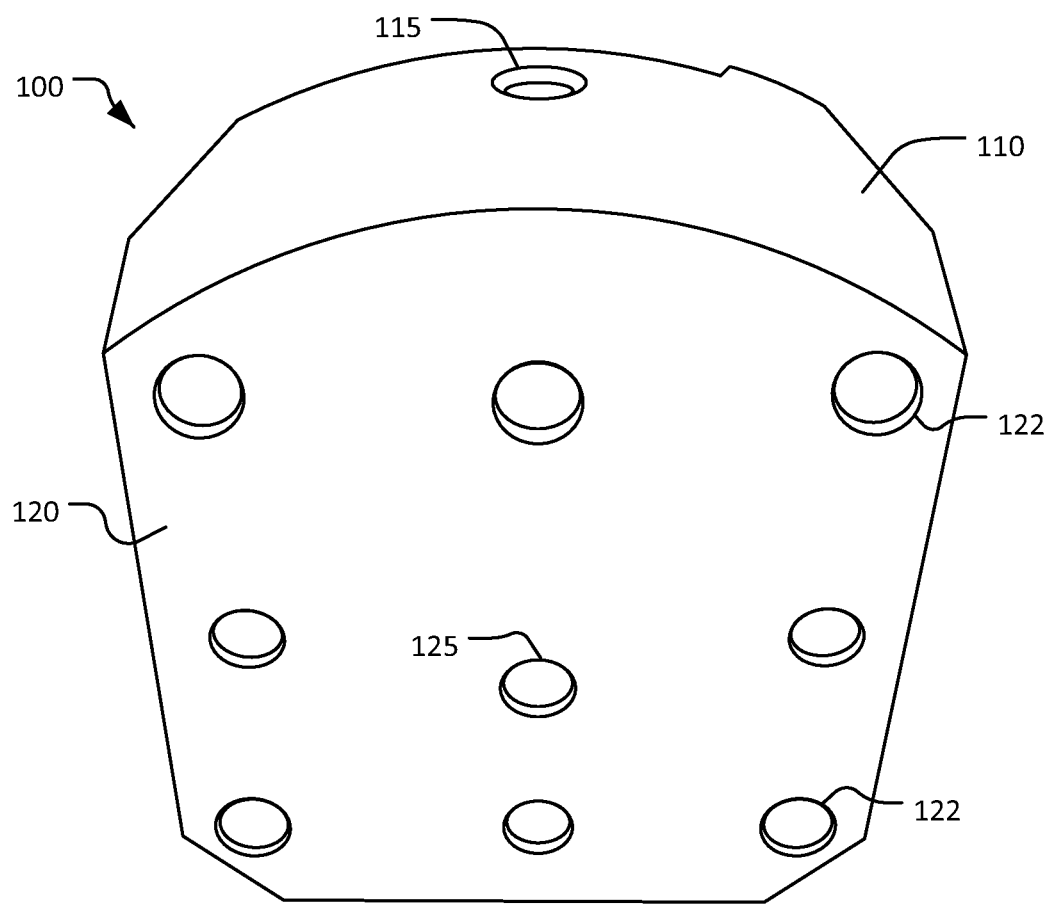
FIG. 3 is another perspective view of the mounting tool of FIG. 1.
Figure 3:
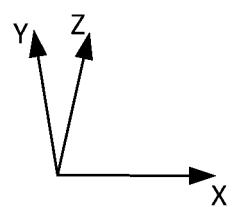

A gas turbine is comprised of a compressor section for compressing ambient air, a combustor section for mixing and burning fuel and the compressed air, and a turbine section driven by the expanding combustion gases for powering the compressor and turning an output shaft for ancillary devices or power generation or for providing thrust for propelling an aircraft.

Some aircraft engine components are subject to wear and tear during operation due to erosive substances, for example, sand, dust, and/or ice. In the front part of the gas turbine, the area of the compressor, erosion generally causes a flattening of the leading edges of the compressor blades. When the compressor blades are not yet worn down, they have an aerodynamically optimized profile that is detrimentally affected by the wear. As a consequence of the deterioration of the aerodynamic profile, the gas turbine loses efficiency, which means that the gas turbine needs more fuel to generate the same power. Therefore, from a financial point of view, it may be desirable to counteract the wear of compressor blades, especially a deterioration of the aerodynamically optimized blade geometries.

Repairing compressor blades, particularly ones having complex geometries, is not a simple task, however. In the prior art, larger compressor blades with simple geometries are typically repaired by first adding material to the blade (e.g., to the damaged leading edge, trailing edge, and/or the tip) using conventional techniques such as manual welding. Because the material added to the blade via such conventional techniques cannot be precisely controlled, more material than is required is typically added to the blade and the extraneous material is then removed to bring the blade within the required specifications. Such may be done when the compressor blade is large and/or has a simplistic shape. When the compressor blade is small, thin, and/or has a complex shape (e.g., curves in the X, Y, and Z planes), however, such removal of additional material to bring the blade within its required specifications is virtually impossible or at least very difficult. When material is removed from the blade, the small/thin compressor blade vibrates and precludes precise repair. Further, the complex shapes of such compressor blades make repair (e.g., milling of the excess material) unduly laborious. In view of such considerations, damaged or worn compressor blades are typically simply scrapped, especially where the blade is small in size and/or its geometry is complex.

Embodiments of dimensional compressor blade repair systems and methods disclosed herein may allow for compressor blades, including small compressor blades having complex shapes and/or geometries, to be repaired with relative ease.

Turning now to FIGS. 1 through 4, an embodiment of a compressor blade mounting tool 100 for use with compressor blade repair equipment is shown. The compressor blade mounting tool 100 may be used in a method 200 (FIG. 5) of repairing a compressor blade 50, as discussed in further detail below. The mounting tool 100 may retain (e.g., temporarily retain) a compressor blade 50 while the blade 50 undergoes repair. Portions of the compressor blade mounting tool 100 may facilitate the construction of one or more sacrificial supports (e.g., sacrificial supports 130 and 140, see FIG. 4) that are built up as the compressor blade 50 is repaired. These sacrificial supports may stabilize the compressor blade 50 such that the blade 50 may undergo both additive and subtractive manufacturing at roughly the same time without suffering from undesirable movement or vibrations. Once the repair is completed, the sacrificial supports may be disassociated from the mounting tool 100 and the compressor blade 50, using, e.g., using electrical discharge machining.

The equipment used to add material to the compressor blade 50 may be an additive manufacturing machine, such as a laser sintering machine. Repairing the compressor blade 50 with a laser sintering machine may involve depositing a metal powder on a platform of the additive manufacturing machine, a surface of the blade 50, and/or the tool 100, and heating the metal powder together into a layer of solid material. Typically, the metal powder is heated using a laser. This depositing and heating process may be repeated until a desired number of material layers are formed on the blade 50. The compressor blade 50 may undergo further processes to complete the repair operation. For example, the compressor blade 50 may undergo a milling process where material (e.g., excess material from the additive manufacturing step) is removed from the compressor blade 50. As another example, the compressor blade 50 may undergo a surface finishing or polishing process, where material is removed from the blade 50 until a desired surface finish is reached.

In some embodiments, the step of adding material to the turbine blade 50 may occur generally at the same time as a milling process (sometimes referred to herein as "hybrid manufacturing"). This may be accomplished either with several pieces of different equipment, or with a singular piece of equipment. For instance, the compressor blade 50 may undergo repair via a piece of equipment configured for both additive manufacturing and subtractive manufacturing. An example machine that allows for such functionality is a Lumex series hybrid manufacturing machine produced by Matsuura Machinery USA Inc. of St. Paul, Minnesota. Significant time and costs may be saved by effectuating both additive and subtractive manufacturing generally simultaneously while the compressor blade is secured to the same mounting tool. Conventional compressor blade repair methods are unable to accomplish hybrid manufacturing effectively, typically because the vibrations/harmonics caused by the milling process displace the compressor blade being repaired and disrupt the additive manufacturing process.

To mitigate such concerns, the compressor blade 50 may undergo repair while it is held by the compressor blade mounting tool 100. A base 110 of the mounting tool 100 may have a slot 118 in which the compressor blade 50 (or a portion thereof) is situated. The compressor blade 50 may be retained within the slot 118 by one or more screws or other fasteners 114. For instance, a base of the compressor blade 50 may be secured within the mounting tool 100 by a screw 114 which displaces along a y-axis, and/or by a screw 114 which displaces along a z-axis (not shown) of the mounting tool 100. The fasteners 114 may be manipulated by a user via one or more apertures in the mounting tool 100. For example, the y-axis screw 114 may be accessible with a tool (e.g., a screwdriver, a hex key, a pin, etc.) via an aperture 115 in the base 110 of the mounting tool 100, while another screw 114 may be accessed via an aperture 125 (FIG. 3) located on a bottom surface 120 of the mounting tool 100. Using the screws 114 and the apertures 115, 125, the mounting tool 100 may be readily adjusted to secure (e.g., temporarily) compressor blades 50 of various sizes. In embodiments, the fasteners 114 may alternatively or additionally be used to adjust a position of the compressor blade 50 within the mounting tool 100.

When secured in the slot 118, the compressor blade 50 may be adjacent an upright portion 112 of the mounting tool 100 that extends upwardly (i.e., in a z-axis) from the mounting tool base 110. The upright portion 112 may at least partially envelope a secured compressor blade 50 in both the x-axis and the y-axis. That is to say, the upright portion 112 may extend from the mounting tool base 110 to provide a surface 113 which is located further along the compressor blade 50 in the z-axis. In embodiments, the surface 113 may be level in the x-y plane.

The compressor blade mounting tool 100 may have one or more mounting features 122 (FIG. 3) for securing the mounting tool 100 to other equipment, such as a hybrid manufacturing machine. The mounting features 122 may be any suitable feature(s) now known or subsequently developed for securing the mounting tool 100 in place. For example, the mounting features 122 may comprise a plurality of apertures which correspond to fasteners or a platform of a hybrid manufacturing machine. The mounting features 122 may be releasable such that a user may selectively attach/detach the mounting tool 100 as desired.

The compressor blade mounting tool 100 may have a plurality of support bases or nubs 116 extending from the upright portion 112 (e.g., from the surface 113 thereof). These support bases 116 may protrude from the mounting tool 100 in the z-axis. In operation, the support bases 116 may provide a platform or surface upon which sacrificial supports (e.g., sacrificial supports 130 and 140, see FIG. 4) may be built while the compressor blade 50 undergoes additive manufacturing. By virtue of the support bases 116 and the sacrificial supports, the compressor blade 50 may be precluded from moving undesirably during the hybrid manufacturing process, and specifically during subtractive manufacturing.

In embodiments, there may be a support base 116 adjacent each of the trailing edge and the leading edge of the compressor blade 50. These support bases 116 may not be in contact with the compressor blade 50 when the blade 50 is secured within the mounting tool 100. That is to say, the support bases 116 may be situated such that there is some space between the support bases 116 and the compressor blade 50. For example, there may be a first support base 116A located near one of the trailing edge and the leading edge of the compressor blade 50 with a first gap 117A therebetween (FIG. 1), and there may be a second support base 116B located near the other of the trailing edge and the leading edge of the compressor blade 50 with a second gap 117B therebetween. The gaps 117A, 117B may be traversed by bridges (e.g., bridges 135 and 145, see FIG. 4) which are built during additive manufacturing and extend between the sacrificial supports and the compressor blade 50. In embodiments, the gaps 117A, 117B may be about less than a hundred-thousandths of an inch wide.

The shape and geometry of the support bases 116 may, in embodiments, generally correspond to the shape and geometry of the compressor blade 50. For example, as depicted in the figures, the support bases 116 may be polyhedrons whose form mimics or follows one or more curves (e.g., x-, y-, and/or z-axis curves) of the compressor blade 50 and the edges thereof. In some embodiments, the support bases 116 may be generally V-shaped such that sacrificial supports built thereon may use relatively less material while still maintaining structural integrity. In general, the form of the support bases 116 may factor into the resulting shape of the sacrificial supports built thereupon, which may be crucial in the development of sacrificial supports which follow and stabilize the compressor blade 50 as the blade 50 is built up. Where the compressor blade is tall, the support bases 116 may likewise be relatively tall to ensure the sacrificial supports built thereon desirably stabilize the compressor blade during repair.

Prior to material being added to a compressor blade 50 that is secured in the mounting tool 100, a topmost edge or tip (e.g., in the z-direction) of the blade 50 may be made level with a topmost edge or surface of at least one of the support bases 116 (i.e., a top of the blade 50 may rest in the same x-y plane as a top of the supports 116). This may be accomplished by, for example, removing material from the compressor blade 50 prior to installing the blade 50 in the mounting tool 100. Alternatively or additionally, the compressor blade 50 and support bases 116 may be made level by adjusting a position (e.g., an x-, y-, and/or z-coordinate thereof) of the blade 50 within the mounting tool 100 by manipulating the fasteners 114. Ensuring the compressor blade 50 and the support bases 116 are level in this manner may facilitate the additive manufacturing step of the repair.

In a currently preferred embodiment, the blade 50 may be secured within the tool 100 and the tip of the blade 50 may then be trimmed together with the support bases 116A and 116B such that each of the blade tip and the support bases 116A and 116B are coplanar. Material may then be added layer by layer to the blade 50 and the support bases 116A, 116B in a planar fashion. By grinding the blade 50 while it is in the tool 100 ensures that the support bases 116A and 116B, which are ground together with the blade 50, e.g., in a machining apparatus, are in the same plane after the grinding operation such that the tool 100 may thereafter be affixed to a hybrid manufacturing machine for carrying out the additive and subtractive processes.

In embodiments, one or more of the support bases 116 may be formed as part of or made integral with the mounting tool 100 (e.g., the upright portion 112 thereof). Alternatively or additionally, in still other embodiments, one or more of the support bases 116 may be releasably attached to the compressor blade mounting tool 100. For instance, the support bases 116 may be selectively secured to the mounting tool 100 using one or more fasteners (e.g., a screw, a bolt, a nail, a clamp, a pin, et cetera). The support bases 116 may be temporarily affixed to the mounting tool 100 in this way for the building of sacrificial supports thereupon. Once hybrid manufacturing of the compressor blade 50 is complete, a user may dissociate both the blade 50 and the support bases 116 from the mounting tool 100. With the mounting tool 100 out of the way, trimming the sacrificial supports from the blade 50 may be much easier.

In embodiments where one or more of the support bases 116 are selectively attachable to the mounting tool 100, a user may readily customize the mounting tool 100 for the repair of a given compressor blade 50. That is to say, the user may swap out a first set of support bases 116 for a second set of support bases 116 which differs in geometry (e.g., shape, form, and/or size) from the first set. Such customizability may be desirable where the user wishes to repair a compressor blade 50 which has geometry that does not correspond to geometry of the first set of support bases 116. In this way, the user may adapt a single mounting tool 100 to repair a plurality of compressor blades 50 having disparate geometries by swapping out support bases 116. Furthermore, selectively attachable support bases 116 may be easy to replace when the original support bases 116 are damaged or otherwise become unsuitable for use. Attachable support bases 116 may be replaced without having to replace or repair the rest of the mounting tool 100.

Figure 4:
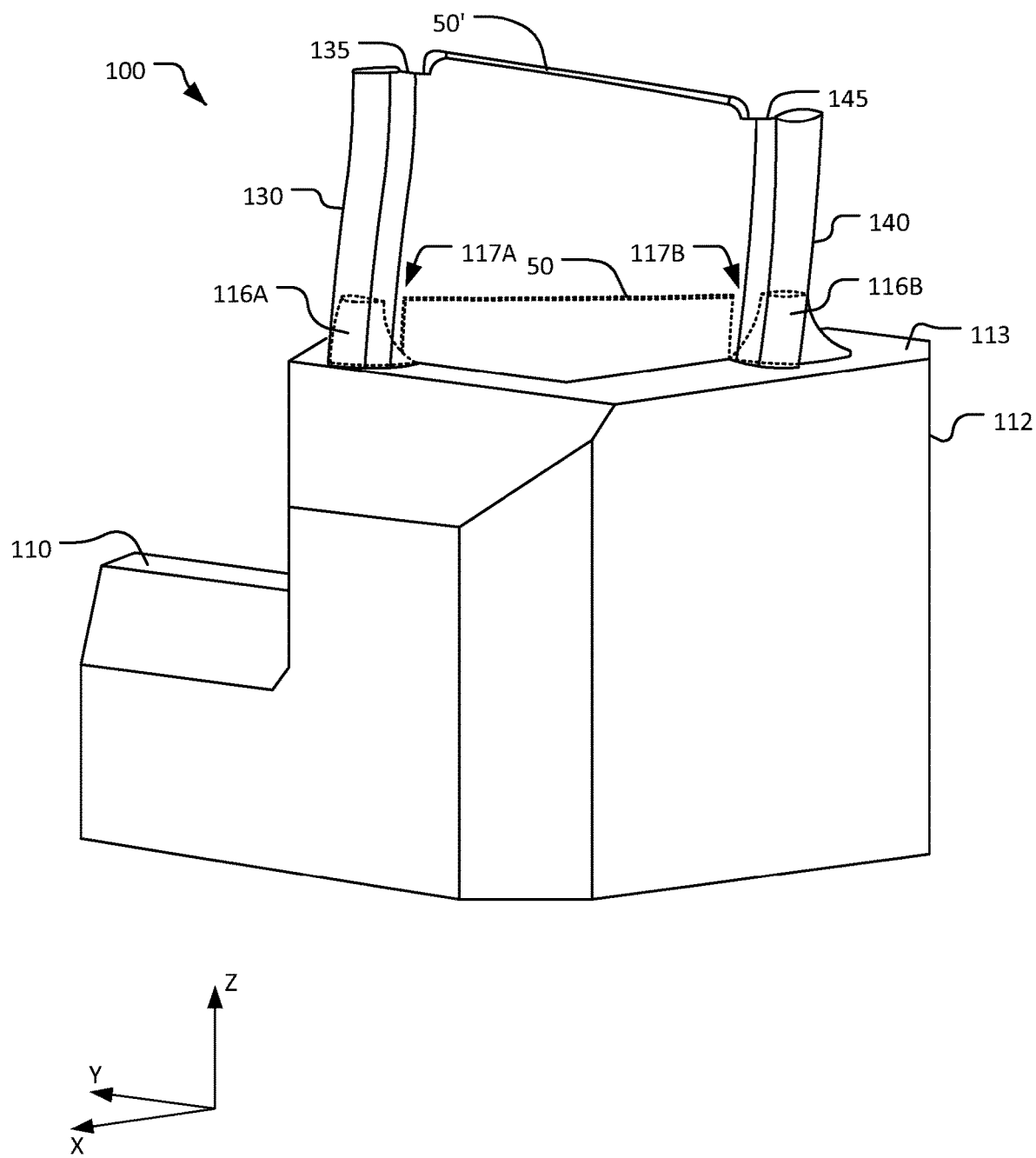
FIG. 4 is yet another perspective view of the mounting tool of FIG. 1, retaining a repaired compressor blade.

Turning now to FIG. 4, a mounting tool 100 having an example built-up (i.e., repaired) compressor blade 50' is depicted. The dashed lines show the compressor blade 50 prior to the additive manufacturing step, together with the support bases 116A and 116B underneath sacrificial supports 130 and 140, respectively. As can be seen, the sacrificial supports 130 and 140 may be built-up and attached to the leading and trailing edges of the compressor blade 50 as material is added to the blade 50. Relatively thin bridges 135, 145 of material may link the sacrificial supports 130, 140 to the compressor blade 50'. Specifically, a first bridge 135 may span the first gap 117A and couple the first sacrificial support 130 to an edge of the blade 50', and a second bridge 145 may span the second gap 117B and couple the second sacrificial support 140 to an opposing edge of the blade 50'. In this way, the sacrificial supports 130 and 140 may stabilize the compressor blade 50, enabling the blade 50 to undergo hybrid manufacturing which may not have otherwise been possible particularly where the shape of the blade 50 is complex. Once the repair of the blade 50 is complete, the sacrificial supports 130, 140 may be removed by machining away the relatively thin bridges 135 and 145.

In embodiments, the geometry of the sacrificial supports 130 and 140 may correspond to the geometry of the repaired blade 50'. That is to say, the sacrificial supports 130, 140 may be built up in the x-, y-, and/or z-direction to mimic or follow the various complex curves of the compressor blade 50. This matching of blade 50 geometry may be facilitated by the geometry of the support bases 116 on which the sacrificial supports 130, 140 are built.

Figure 5:
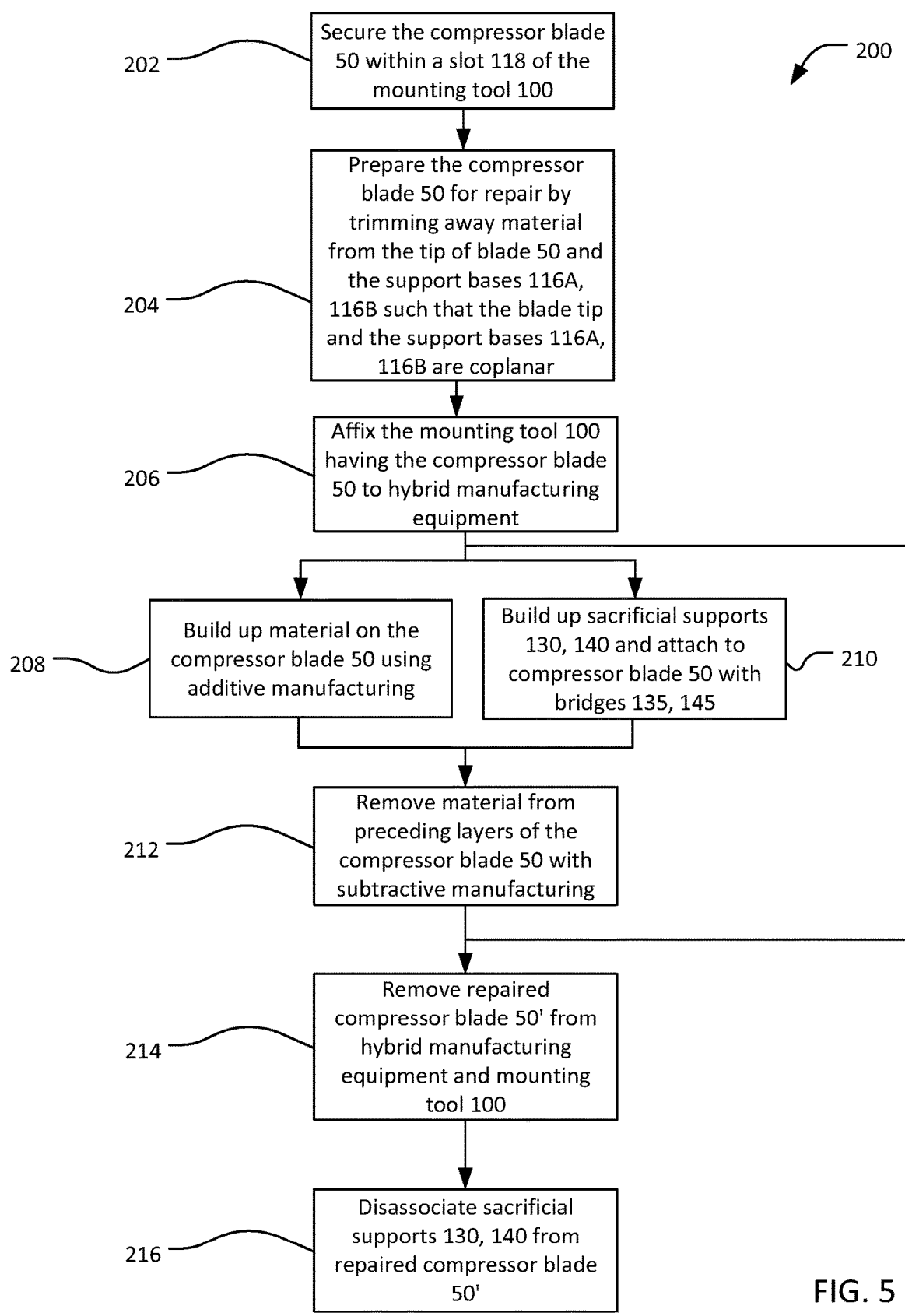
FIG. 5 is a flow diagram depicting a method of repairing a compressor blade using the mounting tool of FIG. 1, according to an embodiment of the present disclosure.

FIG. 5 is a flowchart illustrating an example method 200 of repairing a compressor blade (e.g., a compressor blade having complex geometry) using the compressor blade mounting tool embodiments disclosed herein.

First, at step 202, the compressor blade 50 may be coupled to the mounting tool 100. The compressor blade 50 may be secured within the tool 100 by placing the blade 50 within the slot 118 and using the one or more fasteners 114 to hold the blade 50 in place. The position of the blade 50 within the mounting tool 100 may be adjusted here using the fasteners 114 to, for instance, align the blade 50 with the support bases 116.

At step 204, the compressor blade 50 may be prepped for repair by grinding the tip of the blade 50 and the support bases 116A, 116B together (e.g., via a machining apparatus or other means) such that the support bases 116A, 116B and the blade tip are in the same plane. In other embodiments, material may be removed from the blade 50 while it is outside the tool 100, and the support bases may be ground separately if required, to ensure that the blade tip, once the blade 50 is secured within the tool 100, is in the same plane as the support bases 116A, 116B.

Then, at step 206, once the blade tip and the support bases 116A, 116B are coplanar, the mounting tool 100 and the blade 50 retained therein may be arranged in hybrid manufacturing equipment or machinery. The mounting features 122 of the mounting tool 100 may be used to affix the blade mounting tool 100 to the machinery.

At step 208, additive manufacturing may be used to add material (e.g., in layers) to the compressor blade 50. The additive manufacturing process used may be, for example, laser sintering, where metal powder is deposited on the blade 50 and heated with a laser to form a solid layer. This process may be repeated until a desired amount of material is deposited or a desired number of layers are formed. At step 210, additive manufacturing may be used to build sacrificial supports 130 and 140 and link the supports 130, 140 to the blade 50 via bridges 135, 145. The sacrificial supports 130, 140 may begin on the support bases 116, and the geometry the sacrificial supports 130, 140 may correspond to the geometry of the blade as the blade 50 is built-up. This step may occur generally at the same time as the step of adding material to the compressor blade 50 (i.e., the blade 50, sacrificial supports 130, 140, and the bridges 135, 145 may be built-up generally simultaneously). That is, layers of the blade at step 208, and layers of the sacrificial supports 116A and 116B and bridges 135, 145 at step 210, may generally be formed together.

Next, at step 212, a subtractive manufacturing process may be used to remove material from the blade 50. This may be accomplished via, for example, milling of the blade 50 (e.g., to remove a specific amount of material, to achieve certain blade 50 dimensions, to finish or polish a surface of the blade 50, et cetera). This subtractive manufacturing step may overlap the steps of adding material to the blade 50, the sacrificial supports 130, 140, and the bridges 135, 145. That is to say, while material layers are being added to the blade 50 (step 208), hybrid manufacturing equipment may remove material from preceding layers (i.e., the subtractive process "follows" the additive process). The steps of adding material to and removing material from the blade 50 may be carried out by a singular device configured for hybrid manufacturing. The step of removing material may finish after the steps of adding material have already been completed. The compressor blade 50 may be stabilized and precluded from undue movement during this process by the sacrificial supports 130 and 140.

In embodiments, and as is clear from the flowchart (specifically, from the arrow looping back from step 212 to steps 208/210), at least part of the subtractive process at step 212 may follow at least part of additive processes at steps 208/210 and at least part of the additive processes at steps 208/210 may likewise follow at least part of the subtractive process at step 212. For instance, where two layers of material are to be added, layer 1 may first be formed in steps 208/210 and machined thereafter in step 212, and the method 200 may loop back to step 208/212 for the formation of layer 2 and then to step 212 for the machining of layer 2. The additive steps 208/210 and the substrative step 212 may be repeated in like manner until the repair of the blade 50 is completed.

Next, at step 214, the repaired compressor blade 50' may be removed from the hybrid machinery and dissociated from the mounting tool 100. Then, at step 216, the sacrificial supports 130, 140 may be removed from the repaired compressor blade 50' via machining (e.g., electrical discharge machining). The relatively thin bridges 135 and 145 may be exploited to facilitate this process. Once removed, the repaired turbine blade 50' may undergo any suitable finishing processes, such as machining to clean up the areas where the blade 50' was attached to the sacrificial supports 130, 140.

The artisan will understand that the steps of the method 200 may be readily omitted, added to, and/or modified to implement the various embodiments of the compressor blade mounting tool system described herein. For example, the steps of replacing the support bases 116 with a second set of support bases 116 having a disparate geometry, and then using the second set of support bases 116 to repair a second turbine blade 50 may be added. As yet another example, the step of detaching the support bases 116 from the mounting tool 100 after the blade 50 is repaired may be added in embodiments having support bases 116 that are removably attached to the mounting tool 100. As still another example, the steps of securing the compressor blade 50 in the mounting tool 100 and securing the mounting tool 100 to the hybrid machinery may be carried out in a different order.

In an embodiment, the tool 100 may be modified to allow for the repair of multiple blades simultaneously. For example, a tool having multiple slots each having associated therewith a pair of support bases may be provided to allow for the securement and repair of a plurality of compressor blades at the same time. In this embodiment, all the support bases and blade tips may first be ground such that they are coplanar (e.g., all the blades and the support bases may be ground such that the blades and support bases have a height equal to the height of the shortest blade). This tool, together with the plurality of compressor blades secured thereto, may then be associated with a hybrid manufacturing machine to allow for the additive and subtractive manufacturing to be employed for the simultaneous repair of each of the blades. Repairing multiple blades in the same tool at the same time (e.g., repairing multiple compressor blades from the same engine) may further reduce the costs and time associated with the repair relative to repairing only a solitary blade in each tool.

Thus, as has been described, the mounting tool 100 may facilitate repair of compressor blades having complex geometry (and other blades) by enabling the use of both additive and subtractive manufacturing processes to repair the blade 50 while the blade 50 is coupled to the same mounting tool 100. Without the mounting tool 100, and the support bases 116 thereof, the compressor blade 50 may undesirably move during hybrid manufacturing, thereby precluding effective repair. Furthermore, effectuating both subtractive and additive manufacturing generally at the same time may reduce process time significantly relative to conventional repair methods. A mounting tool 100 having releasably fixed support bases 116 may allow for a cost-effective mounting tool 100 which may be readily adapted for repairing compressor blades of varying geometry.

The artisan will understand that embodiments of the compressor blade repair mounting tool disclosed herein may include or have associated therewith electronics (e.g., hybrid manufacturing equipment). The electronics may be used to control, modify, and/or facilitate the operation of the blade repair mounting tool. In some example embodiments, processor or processors may be configured through particularly configured hardware, such as an application specific integrated circuit (ASIC), field-programmable gate array (FPGA), etc., and/or through execution of software to allow the blade repair mounting tool and/or the hybrid manufacturing equipment to function in accordance with the disclosure herein.

While example applications (e.g., compressor blade repair) are used to illustrate the workings of the system and methods disclosed herein, the artisan will understand that the embodiments disclosed herein may be adapted to other repair applications, and that such adaptations are within the scope of the present disclosure. For example, embodiments of the disclosure herein may be adapted for turbine blade repair.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the various figures need be carried out in the specific order described.

The invention claimed is:

1. A method of repairing a compressor blade, the method comprising:
providing a mounting tool, said mounting tool having a plurality of support bases and a slot, said slot configured for securement of said compressor blade to said mounting tool;
securing said compressor blade to said mounting tool via said slot;
associating said mounting tool and said secured compressor blade with a hybrid manufacturing machinery;
additive manufacturing to: (a) add material to said compressor blade secured to said mounting tool; (b) add material to said plurality of support bases to form a sacrificial support on each of said plurality of support bases; and (c) build a bridge spanning from said compressor blade to each said sacrificial support; and
subtractive manufacturing to remove material from said compressor blade while said compressor blade is secured to the mounting tool;
wherein, at least a portion of one of said sacrificial supports stabilizes said compressor blade during at least a part of each of said subtractive manufacturing and said additive manufacturing.

2. The method of claim 1, wherein said subtractive manufacturing is initiated before said additive manufacturing is completed.

3. The method of claim 1, wherein at least one of said plurality of support bases is formed as part of at least one of said mounting tool.

4. The method of claim 1, wherein each of said plurality of support bases is releasably attached to said mounting tool.

5. The method of claim 1, further including dissociating each said sacrificial supports from said compressor blade.

6. The method of claim 1, wherein said mounting tool includes a fastener for securing said compressor blade within said slot.

7. The method of claim 6, further including tightening said fastener via an opening in said mounting tool.

8. The method of claim 1, further including disassociating said compressor blade from said mounting tool.

9. The method of claim 8, further including finishing said compressor blade after said compressor blade is disassociated from said mounting tool.

10. A method of repairing a compressor blade, comprising:
providing a mounting tool, said mounting tool having a plurality of support bases and a slot, said slot configured for securement of said compressor blade to said mounting tool;
securing said compressor blade to said mounting tool via said slot;
associating said mounting tool and said secured compressor blade with a hybrid manufacturing machinery;
using each of additive manufacturing and subtractive manufacturing to repair said compressor blade while said compressor blade is secured to said mounting tool; and building a sacrificial support on each of said plurality of support bases wherein said additive manufacturing includes building a plurality of bridges, each of said plurality of bridges connecting said compressor blade to one of said sacrificial supports.

11. The method of claim 10, further including removing said compressor blade from said mounting tool for finishing.

12. The method of claim 10, wherein at least a first part of said additive manufacturing is effectuated prior to at least a first part of said subtractive manufacturing and at least a second part of said additive manufacturing is effectuated after said first part of said subtractive manufacturing.

13. A method of repairing a blade using a mounting tool, the mounting tool having a slot and a plurality of support bases, the method comprising:

securing said blade to said mounting tool via said slot;

associating said mounting tool and said secured blade using a hybrid manufacturing machinery;

additive manufacturing to: (a) add material to said blade secured to said mounting tool; (b) add material to said plurality of support bases to form a sacrificial support on each of said plurality of support bases; and (c) build a bridge spanning from said blade to each said sacrificial support; and subtractive manufacturing to remove material from said blade while said blade is secured to said mounting tool;

wherein, at least a portion of one of said sacrificial supports stabilizes said blade during at least a part of each of said subtractive manufacturing and said additive manufacturing.

14. The method of claim 13, wherein said subtractive manufacturing is initiated before said additive manufacturing is completed.

15. The method of claim 13, wherein each of said plurality of support bases is releasably attached to said mounting tool.

16. The method of claim 13, wherein each of said plurality of support bases is attached to said mounting tool.

* * * * *